Figure 5:
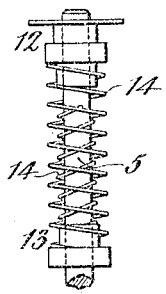

A. E. VOSS.
SPEED INDICATOR AND RECORDER.
APPLICATION FILED JAN. 27, 1908.
919,657.
Patented Apr. 27, 1909.
2 SHEETS—SHEET 1.
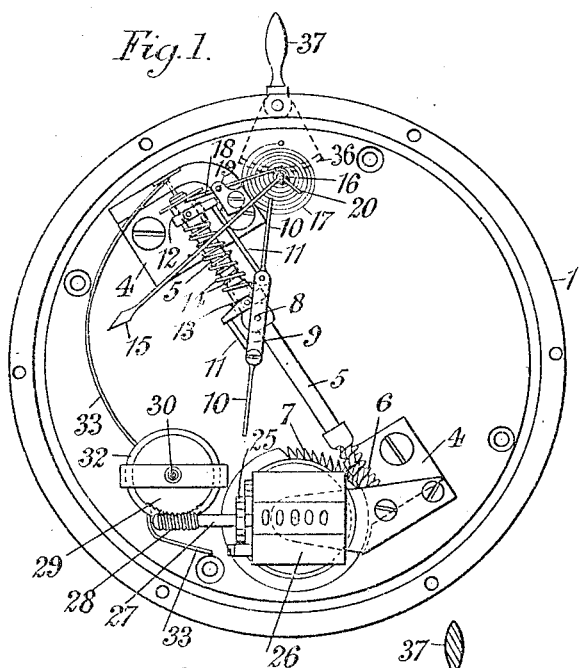
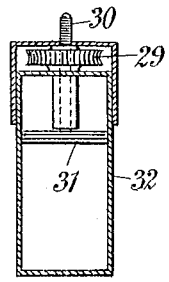
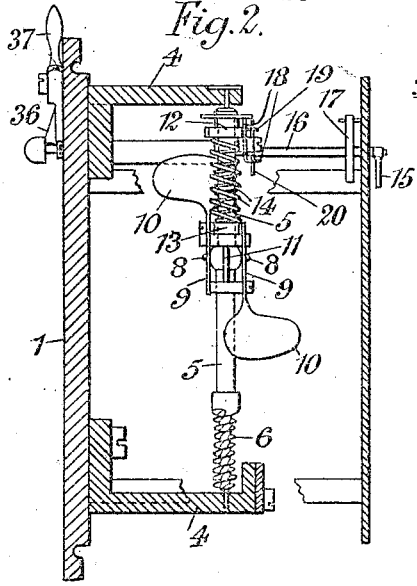
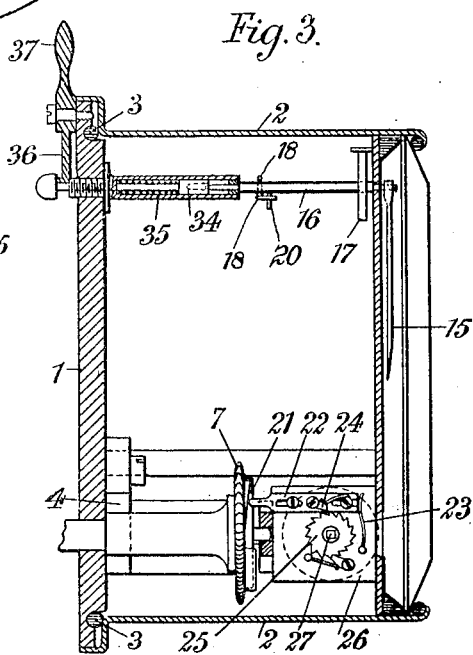
Witnesses
M. Lilian Adams.
C. B. Franzoni.
Inventor
Alfred E. Voss
By his Attorneys,
Baldwin Wight

UNITED STATES PATENT OFFICE.

ALFRED EMIL VOSS, OF GUNNERSBURY, ENGLAND.

SPEED INDICATOR AND RECORDER.

No. 919,657.         Specification of Letters Patent.      Patented April 27, 1909.

Application filed January 27, 1908. Serial No. 412,925.

*To all whom it may concern:*

Be it known that I, ALFRED EMIL VOSS, engineer, a subject of the King of Great Britain, residing at 65 Oxford road, Gunnersbury, in the county of Middlesex, England, have invented new and useful Improvements in Speed Indicators and Recorders, of which the following is a specification.

In speed indicators and recorders it has before been proposed to use centrifugal mechanism acting against springs in a similar manner to that adopted in centrifugal governors and to give motion from such mechanism to an indicator hand or pointer.

The object of my improvements is to reduce the weight of the revolving parts to a minimum so that the indicator hand may always give correct indications free from the effects of momentum. To effect this in place of using solid metallic governor balls or weights which fly outward away from the revolving spindle by which they are carried, as is customary in ordinary centrifugal governors I substitute for them light fan blades of thin sheet metal so disposed that as they are carried around by the revolving spindle the air resistance acting against them tends to move them outward away from the spindle. Their outward movement is thus mainly effected by air resistance and therefore their weight and consequent momentum can be much reduced.

When ordinary governor balls are used what is known as "hunting" takes place, that is, when the speed is suddenly accelerated the momentum given to the balls carries them too far outward, the springs then suddenly draw them back again and in turn draws them back too far and so the indicator hand is kept oscillating to and fro and rarely remains steady if the speed is constantly being more or less varied as is unavoidable with motor cars and the like. When light fan blades disposed in the above manner are substituted for governor balls the indicator hand moves steadily from one position to another as the speed varies and the constant oscillating to and fro of the indicator hand is done away with.

The fan blades may be carried at the outer ends of arms which are free to turn on pins extending out from opposite sides of and at right angles to the spindle so that the arms are free to turn either into positions approaching to parallelism with the spindle or into positions approaching to a plane at right angles to it.

One blade may be carried at the end of an arm extending from the spindle in one direction and another at the end of an arm extending in the opposite direction.

The two arms may be coupled by links to two sleeves or collars which surround the spindle and are free to slide along it. Coiled springs surrounding the spindle may be interposed between the two collars to press them away from one another and tend always to turn the arms into positions approaching to parallelism with the spindle.

When the arms are turned into a position at right angles to the spindle the blades carried by them lie on one side of or mostly on one side of a radial line extending from the spindle in a direction at right angles to the pins on which the arms turn.

When the arms and the fan blades carried by them are turned into positions approaching to parallelism with the spindle and the spindle is revolved, the leading flat face of each fan blade is driven against the air and the pressure of air against it tends to turn the arm which carries the blade toward a position at right angles to the spindle and this movement will be more or less impeded by the action of the springs.

When the arms are brought into such a position that they lie in a plane at right angles to the spindle the blades may lie flat in this plane or they may be made to incline somewhat from this position so that they may then form approximately part of a screw thread of slow pitch. In this way they may be made to continue to act as fan blades even when turned into this position.

Figure 6:
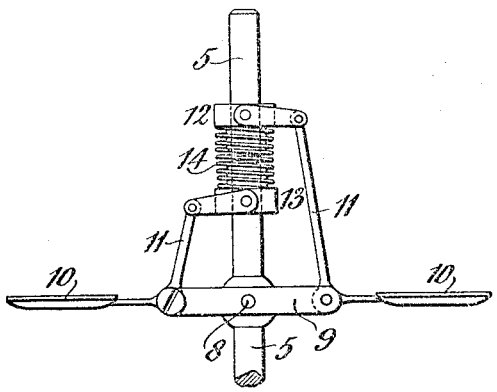
Figure 7:
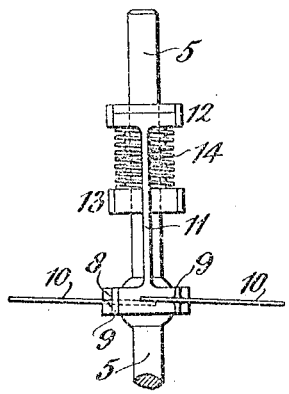

In the drawings annexed Figure 1 is a face view of the instrument with the cover and dial plate removed. Fig. 2 is a side elevation with the base plate in section in a plane passing through the longitudinal central line of the main spindle. Fig. 3 is a central vertical section of the instrument with the parts contained in the lower part of the casing shown in full and Fig. 4 is a section of an oil supplying device for automatically supplying oil to the parts which require to be lubricated. Fig. 5 is an enlarged elevation of a portion of the revolving spindle and the springs surrounding it. Figs. 6 and 7 are elevations of a portion of the revolving spindle and one of the fan blades, showing the blade so inclined to the spindle as to form practically part of a screw thread of slow pitch.

In Figs. 1, 2 and 3, 1 is the base of the instrument, 2 its cover, and 3 a rubber packing interposed between them, 4 are brackets projecting from the base 1. 5 is a spindle the ends of which turn in bearings in the brackets 4. 6 is a double spiral worm at one end of the spindle 5. This worm gears into a toothed wheel 7 by which it is driven. The axis of the toothed wheel 7 may be driven in any suitable manner.

Passing through the spindle 5 is a transverse spindle 8, each end of this transverse spindle has turning upon it an arm 9 at the end of which is carried a thin fan blade 10. The two arms extend in opposite directions and may be coupled together with distance pieces between them as shown. The blade carried by one arm extends sidewise from it in one direction and the blade carried by the other extends sidewise in the opposite direction as shown at Fig. 2.

11 is a link connecting one arm 9 with a collar 12 which is free to slide along the spindle 5 and similarly the other arm is coupled by another link 11 with another collar 13.

14 are two coiled springs surrounding the spindle 5 one within the other and of different lengths placed in between the two collars 12, 13. When the spindle is revolving slowly the collars are restrained from moving toward one another by the longer spring only which may be a very light one but as the speed of revolution is increased and the collars come closer together the shorter spring or springs come into action and assist in pressing the collars apart.

15 is an indicator hand on a spindle 16.

17 is a coiled spring which tends always to turn the spindle 16 in a direction to bring the indicator hand to its zero position. To give a partial turn in the opposite direction to this spindle from the collar 12 when it moves toward the collar 13 I employ a lever 18 turning on a fulcrum 19. The end of one arm of the lever is made to form a stop against which a short arm 20 projecting from the spindle 16 is held by the action of the coiled spring 17. The end of the other arm of the lever is by the action of the spring kept bearing against the collar 12. Thus as the collar moves to and fro along the spindle 5 a turning movement is given to the spindle 16 and so to the indicator hand.

To record the total number of revolutions made by the driving toothed wheel 7, one face of this wheel has upon it an inclined cam path 21 from which a to and fro motion is given to a slide 22 which is held against it by a spring 23. A pawl 24 carried by the slide engages with and drives a ratchet wheel 25 and so gives motion to a train of ordinary recording wheels in a casing 26. The spindle 27 of the ratchet wheel 25 I also prolong as shown in Fig. 1 and form upon it a worm 28 by which a slow revolving motion is given to a nut 29. This nut as it is turned gives an endwise movement to a screw rod 30 which is fixed to a piston 31 working in a cylinder 32 containing lubricating oil. In this way the turning of the worm gives a slow movement to the piston 31 and forcing it against the lubricant contained in the cylinder forces the lubricant through channels 33 to the various points at which lubrication has to be provided for.

To provide means for locking the indicator hand in whatever position it may happen to be in at any one time, one end of the spindle is formed with a tapering point as shown in Fig. 3 against which a tapering socket in a sliding block 34 can be pressed by the action of a spring 35 and by the friction thereby put upon it restrain the spindle from being turned away from the position it may then be in.

Normally the sliding block is held back by a head at the end of its stem resting against an incline on a segment 36 but when the indicator hand is to be locked to keep a record of the speed at that particular time the incline is moved away by giving a partial turn to the segment 36 by its handle 37.

Speed indicators and recorders constructed in the above manner are applicable not only for indicating the speed at which motor cars and the like are being driven and for recording the distance traveled but are also applicable for indicating and recording the speed and total number of revolutions made by any revolving wheel or spindle.

What I claim is:—

1. In a speed indicator, the combination of a driven revolving spindle, a second spindle carried by and at right angles to the driven spindle, an arm upon this spindle, means tending to turn the arm toward a position parallel with the driven spindle, a fan blade carried by the outer end of the arm which lies mostly on one side of a radial line extending from the driven spindle in a direction at right angles to the second spindle so that the resistance of air against the fan blade when the driven spindle revolves may cause the arm to turn outward away from the spindle, an indicator and means by which the indicator is shifted by the movement of the arm.

2. In a speed indicator, the combination of a driven revolving spindle, a second spindle carried by and arranged at right angles to the driven spindle, an arm free to turn on said second spindle, means tending to turn the arm toward a position parallel with the driven spindle, a fan blade carried by the outer end of the arm which not only lies on one side of a radial line extending from the driven spindle in a direction at right angles to the second spindle, but which also forms approximately a portion of a screw-thread around the spindle when the arms are at right angles to the spindle, an indicator, and means by which the indicator is shifted on the movement of the arm.

3. In a speed indicator, the combination of a spindle, means for transmitting a revolving motion to this spindle, a second spindle projecting out from the first at right angles to it, an arm free to turn on this second spindle, a fan blade carried by the arm which by the resistance of the air against it tends to move outward away from the spindle as the spindle revolves, a collar surrounding the driven spindle and means by which the collar is shifted to and fro along the driving spindle as the arm turns on the second spindle, a spring acting upon the collar in a direction to turn the arm toward a position parallel with the driven spindle, an indicator and means for transmitting motion to the indicator from the sliding collar.

4. In a speed indicator, the combination of a spindle, means for transmitting a revolving motion to this spindle, a second spindle carried by the first at right angles to it, arms free to turn on this second spindle, fan blades carried by the arms, two collars free to slide along the driven spindle, links connecting these collars to the arms one to one arm extending out from one side of the spindle the other to another arm extending out from the opposite side of the spindle, a coiled spring surrounding the spindle interposed between the two collars, an indicator and means for transmitting motion to the indicator from one of the sliding collars.

5. In a speed indicator, the combination of the spindle 5, transverse spindle 8 carried by it, arms 9 free to turn on the transverse spindle, fan blades 10 carried by the arms, collars 12 and 13 free to slide along the spindle, spring 14 surrounding the spindle and interposed between the collars, links 11 coupling the collars to the arms 9, an indicator hand 15, a spindle 16 on which the indicator hand is arranged, a spring 17 acting to turn this spindle in one direction, an arm 20 projecting from this spindle and a lever 18 one end of which rests against one of the collars while its other end forms a stop against which arm 20 is held by the action of the spring 17.

ALFRED EMIL VOSS.

Witnesses:
H. D. JAMESON,
E. WILKING.